United States Patent [19]

Batjukov et al.

[11] 4,242,178
[45] Dec. 30, 1980

[54] DRUM FOR STORAGE OF NUCLEAR REACTOR FUEL ASSEMBLIES

[76] Inventors: Vladimir I. Batjukov, ulitsa Prygunova, 9, kv. 29; Alexandr F. Shapkin, ulitsa Zvezdinka, 3, kv. 64; Alexandr I. Fadeev, ulitsa Engelsa, 21, kv. 46; Tsolak G. Shkhian, naberezhnaya Zhdanova, 6, kv. 16; Vitold A. Sumatokhin, ulitsa Strazh Revoljutsii, 28, kv. 21, all of Gorky, U.S.S.R.

[21] Appl. No.: 867,536

[22] Filed: Jan. 6, 1978

[51] Int. Cl.² .......................... G21C 19/20; G21F 5/00
[52] U.S. Cl. ........................................ 176/30; 176/37; 250/507
[58] Field of Search ........................ 176/30, 31, 32, 87, 176/50, 78, 37; 250/506, 507

[56] References Cited

U.S. PATENT DOCUMENTS

| | | | |
|---|---|---|---|
| 3,153,619 | 10/1964 | Ericsson | 250/506 |
| 3,846,234 | 11/1974 | Class | 176/78 |
| 3,936,349 | 2/1976 | Prescott | 176/78 |
| 3,936,350 | 2/1976 | Borst | 176/78 |
| 4,042,828 | 8/1977 | Rubinstein | 250/507 |

*Primary Examiner*—Donald P. Walsh
*Attorney, Agent, or Firm*—Fleit & Jacobson

[57] ABSTRACT

A drum for storage of nuclear reactor fuel assemblies, comprises a housing accommodating a vertically set cylinder with holders, extending along the height of the cylinder for spent fuel assemblies having portions bent along their length. Provided in the walls of each holder is a means for accommodating the fuel assembly portion bent along the length of the assembly, which permits the size and weight of the drum to be substantially reduced.

4 Claims, 5 Drawing Figures

DRUM FOR STORAGE OF NUCLEAR REACTOR FUEL ASSEMBLIES

The present invention relates to nuclear reactors, and more particularly to drums for storage of nuclear reactor fuel assemblies.

Such a drum is used for temporary storage of spent fuel assemblies during recharging of a nuclear reactor, when spent fuel assemblies are replaced with new ones.

During operation in the reactor core, a fuel assembly is subjected to heat unevenly distributed over its diameter, as well as to neutron irradiation. As a result, spent fuel assemblies have portions bent along their length.

There are known drums for storage of fuel assemblies, comprising a housing accommodating a vertically set cylinder with holders, extending along the cylinder height, for spent fuel assemblies having portions bent along their length.

In said drums, the holders are made as solid pipes whose inner diameter is greater than the outer diameter of a spent fuel assembly plus the curvature of the portion bent along the fuel assembly length.

Because of the srum holder inner diameter being increased by the amount of bending of the spent fuel assembly, drums of such design are too bulky and heavy, which makes their manufacture and installation more costly.

It is an object of the present invention to provide a drum for storage of nuclear reactor fuel assemblies, of reduced size and weight, hence, less costly in manufacture and easier in installation.

This object is attained in a drum for storage of nuclear reactor fuel assemblies, comprising a housing accommodating a vertically set cylinder with holders, extending along the cylinder height, for spent fuel assemblies having portions bent along their length, wherein, according to the invention, a means is provided in the walls of each holder for accommodating a fuel assembly portion bent along the assembly length.

The walls of each holder should preferably be formed by a pipe section secured on the top end face of the cylinder and having a length shorter than the cylinder height, while the remaining portion of the holder, along the cylinder height, serves as the means for accommodating the fuel assembly portion bent along the assembly length.

To provide for more reliable holding of fuel assemblies, the walls of each holder should preferably be formed by another pipe section arranged coaxially with the first pipe section and in the immediate proximity to the bottom end face of the cylinder.

In the case where fuel assemblies are shaped as polygonal prisms, the means for accommodating the fuel assembly portion bent along the assembly length should preferably be in the form of longitudinal grooves equal in number to the fuel assembly edges, made in the walls of each holder at a distance between their centers along the inner perimeter of the holder walls, across its section equal to the length of an assembly edge.

Such a design of the drum permits accommodating, in its holders, spent fuel assemblies having portions bent along their length, the inner diameter of a holder in such a drum being less than the outer diameter of a spent fuel assembly plus the curvature of the bent portion, which enables the inner diameter of a holder, hence the size and weight of the drum, to be reduced.

The invention will now be described in greater detail with reference to specific embodiments thereof, taken in conjunction with the accompanying drawings, wherein.

Figure 1:
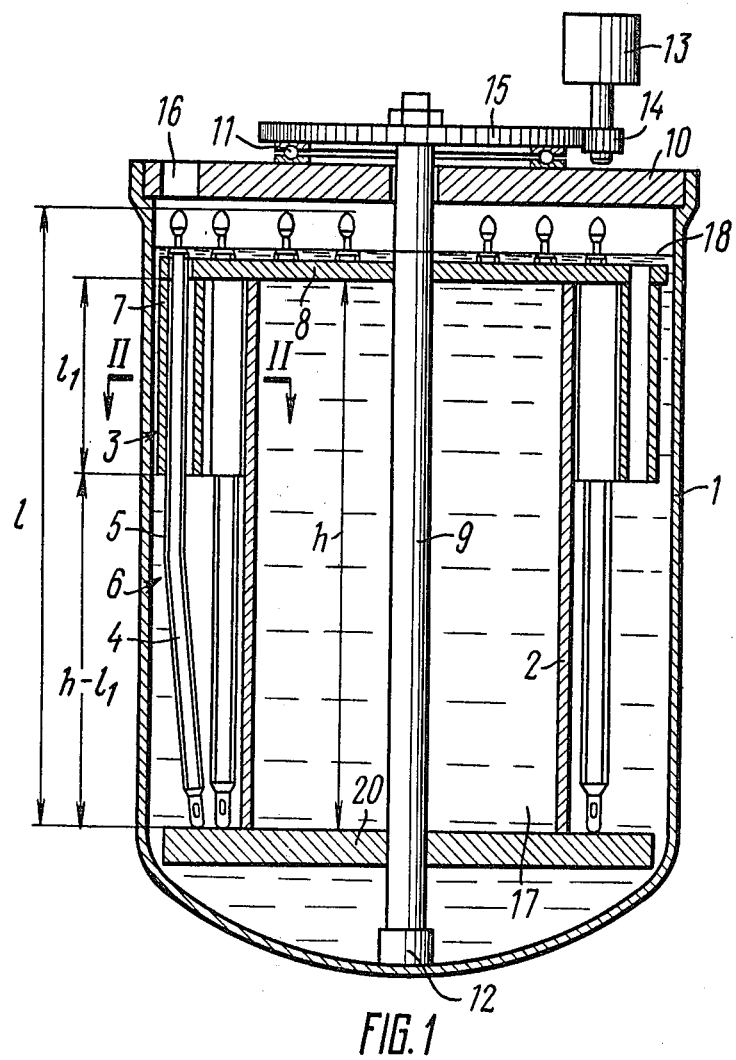
FIG. 1 is a longitudinal section view of a drum for storage of nuclear reactor fuel assemblies, according to the invention.

Referring now to FIG. 1, the drum for storage of nuclear reactor fuel assemblies comprises a housing 1 accommodating a vertically set cylinder 2 with holders 3 extending along the cylinder height, for spent fuel assemblies 4 having portions 5 bent along the length 1 of the assemblies 4.

In the walls of each holder 3, there is provided a means 6 for accommodating the portion 5 of the fuel assembly 4, bent along the length 1 of the latter. In this embodiment, the walls of each holder 3 are formed by a pipe section 7 secured on the top end face, or plate 8, of the cylinder 2 and having a length $l_1$ shorter than the height h of the cylinder 2, while the remaining portion $h-l_1$ of the holder 3, along the height h of the cylinder 2, serves as the means 6 for accommodating the portion 5 of the fuel assembly 4, bent along its length 1.

Figure 2:
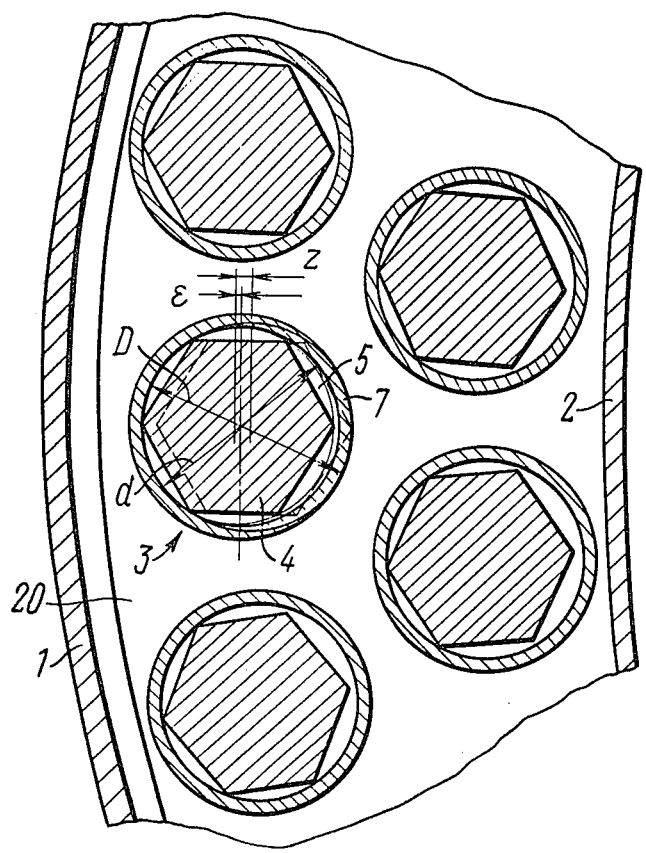
FIG. 2 is an enlarged section view taken along line II—II of FIG. 1.

The amount of bending of a fuel assembly 4 having a bent portion 5 is labelled Z in FIG. 2. The dashed line in the same drawing shows the position of the fuel assembly 4 in cross-section, at the point of its maximum bending. The inner diameter of the pipe section 7 is greater than the outer diameter d of the fuel assembly 4 by the width of gap $\epsilon$ but less than value D which is equal to the outer diameter d of the fuel assembly 4 plus the amount Z of bending ($D = d + Z$).

The amount Z of bending of the spent fuel assembly 4, shown in the drawing, equals the thickness of the walls of the holder 3 plus the width of the gap $\epsilon$.

However, bearing in mind that fuel assemblies 4 are bent, during operation in the reactor core, in the same direction and, in the course of transfer by an appropriate recharging mechanism (not shown), do not change their position, the proposed design of the drum permits placing therein spent fuel assemblies 4 with a greater amount of bending, without increasing, therewith, the inner diameter of a holder 3, hence, the size and weight of the drum.

The cylinder 2 (FIG. 1) is arranged in the housing 1 rotatably about the shaft 9 which passes through a lid 10 of the housing 1 and fitted in bearings 11 and 12. The shaft 9 is rotated by a conventional drive 13 (not described for being obvious) via a pair of gears 14 and 15.

The holders 3 are arranged in two rows, concentrically to the shaft 9, a holder 3 (FIG. 2) of one row being located, radially, opposite the gap between two holders 3 of the other row.

The lid 10 (FIG. 1) is provided with two holes, one per row (the drawing shows only one hole), for fuel assemblies to be introduced into the drum and withdrawn therefrom by means of the recharging mechanism.

The housing 1 of the drum is filled with a coolant 17 up to a level 18.

The embodiment of the proposed drum, under consideration, is preferable for round fuel assemblies as well as fuel assemblies shaped as polygonal prisms, in this case, hexagonal ones.

To simplify the design of a holder, hence, to render the drum less expensive, the holder walls can be made up of separate plates or angles so that each plate or angle may serve as a wall of its own holder and that of an adjacent one.

Figure 3:
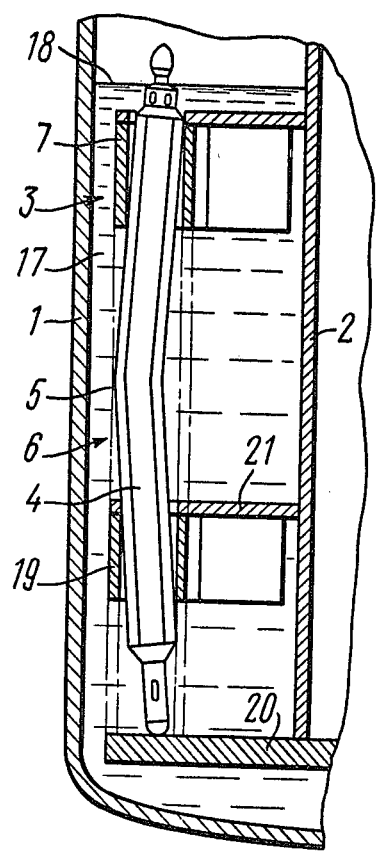
FIG. 3 is an enlarged partial longitudinal section view of another embodiment of a drum for storage of nuclear reactor fuel assemblies, according to the invention.

In the embodiment shown in FIG. 3, to provide for more reliable holding of a fuel assembly 4, the walls of each holder 3 are formed by another pipe section 19 arranged coaxially with the first pipe section 7 and in the immediate proximity to the bottom end face, or plate 20, of the cylinder 2. The pipe section 19 is secured by means of a plate 21 fixed on the cylinder 2. In this embodiment, the means 6 for accommodating the bent portion 5 of a fuel assembly 4 is located between the pipe sections 7 and 19.

Figure 4:
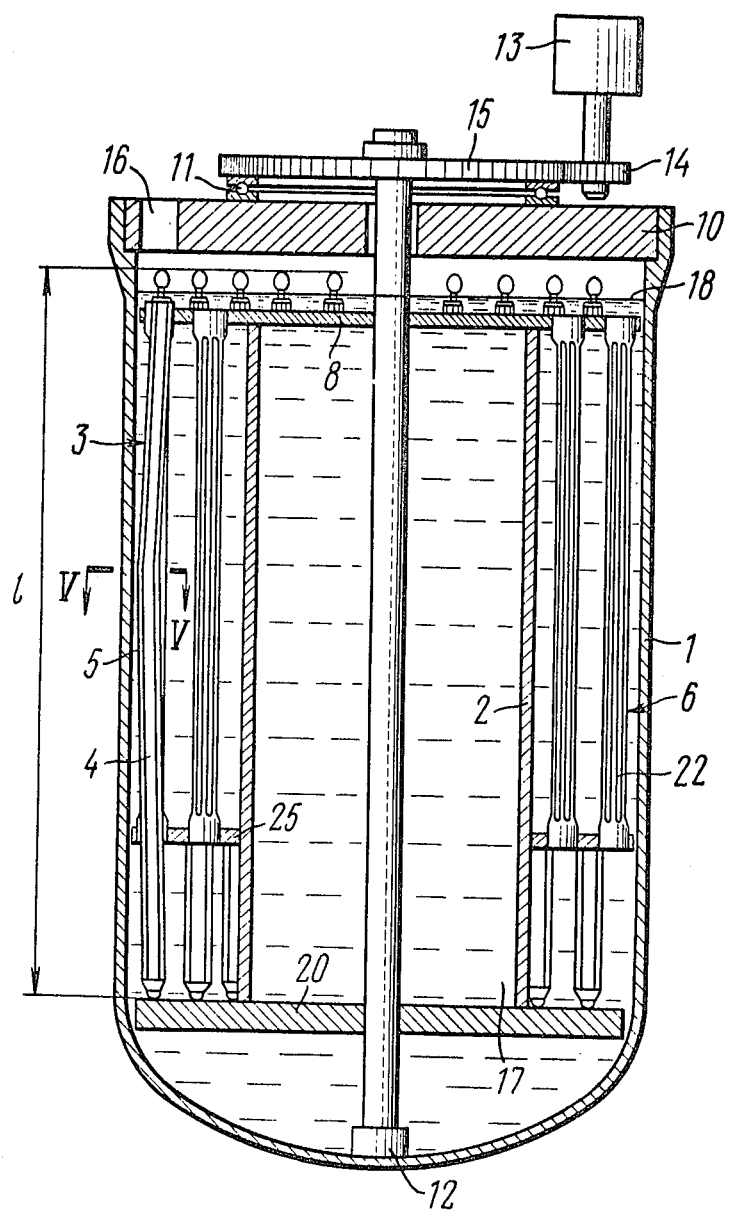
FIG. 4 is a longitudinal section view of a third embodiment of the drum according to the invention.
Figure 5:
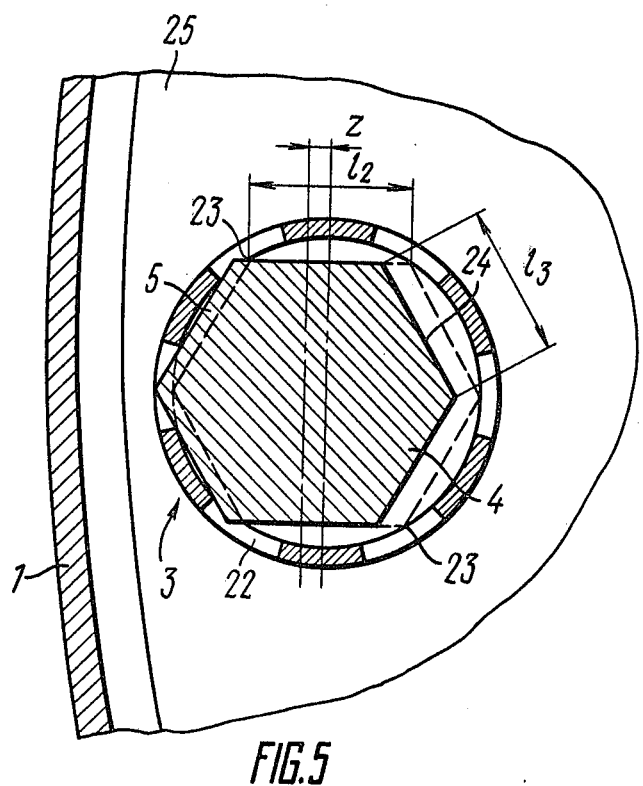
FIG. 5 is a section view taken along line V—V of FIG. 4.

In the case of fuel assemblies 4 (FIG. 4) being shaped as hexagonal prisms, the means 6 for accommodating the bent portion 5 of a fuel assembly 4 may have a different design. Here, the means 6 is made in the form of longitudinal grooves 22 equal in number (six) to the edges of the fuel assembly 4, made in the walls of each holder 3 at a distance $l_2$ (FIG. 5) between their centers 23 along the inner perimeter of the walls of the holder 3, across its section equal to the length $l_3$ of an edge 24 of the fuel assembly 4 ($l_2 = l_3$). The holders 3 (FIG. 4) are attached, with their bottoms, to a plate 25 secured to the cylinder 2.

In this particular embodiment, the inner diameter of the holder 3 (FIG. 5) is also smaller than the outer diameter of the fuel assembly 4 plus the amount Z of its bending, which is shown equal to the wall thickness of the holder 3. The holders 3 being provided with grooves 22 in their walls become more pliable and can deflect as they receive fuel assemblies 4 with an amount Z of bending greater than usual.

The principle of operation of the proposed drum for storage of nuclear reactor fuel assemblies is as follows:

The drive 13 (FIGS. 1 and 4) rotates the cylinder 2, and a vacant holder 3 is aligned with the hole 16 in the lid 10. The recharging mechanism places a spent fuel assembly 4 in this holder 3. At the same time, the bent portion 5 of the fuel assembly 4 is accommodated in the means 6 of the holder 3, i.e., occupies the space $h - h_1$ according to FIG. 1, or the space between the pipe sections 7 and 19 according to FIG. 3, or the longitudinal grooves 22 according to FIG. 4.

As the cylinder 2 (FIGS. 1 and 4) is rotated further through a preset angle, the holders 3 receive spent fuel assemblies 4. After the period required for the afterheat in the fuel assemblies 4 to discontinue is over, they are withdrawn from the drum.

The invention permits placing spent fuel assemblies in drum holders having an inner diameter smaller than the outer diameter of a spent fuel assembly plus the amount of its bending, which enables the size and weight of the drum to be reduced, hence, the drum to be made less costly in manufacture and easier in installation.

What is claimed is:

1. A drum for storage of elongated, spent, nuclear reactor fuel assemblies having portions bent along their length a total lateral distance Z, comprising:
    a housing;
    a cylinder positioned vertically in said housing and having a top end face and a bottom end face;
    holder means for holding said fuel assemblies in a position substantially along the vertical direction of said cylinder, said holder means connected with said cylinder;
    wherein said holder means comprises a plurality of walls defining enclosures extending substantially along the vertical direction of said cylinder for accommodating said fuel assemblies, said enclosures each having an inner diameter greater than the outer diameter of a fuel assembly and less than the sum of the outer diameter of said fuel assembly and the distance Z and said enclosures further each having a longitudinal portion which is at least partly open for accommodating the bent portion of one of said assemblies.

2. A drum for storage of nuclear reactor fuel assemblies as claimed in claim 1, wherein each of said enclosures comprise a first pipe section secured to said top end face of said cylinder and having a length less than said height of said cylinder, wherein the interior of said drum below said first pipe section, along said height of said cylinder, defines said longitudinal portion of each enclosure and serves to accommodate said portion of said fuel assembly that is bent along said length of said assembly.

3. A drum for storage of nuclear reactor fuel assemblies as claimed in claim 1, wherein said fuel assemblies are shaped as polygonal prisms in cross-section and having edges, wherein said plurality of walls defining said enclosures include a plurality of longitudinal grooves equal in number to said edges of said fuel assembly said grooves defining said longitudinal portion of each enclosure wherein the distance between the centers of adjacent grooves, along the inner perimeter of said walls, is equal to the length of said fuel assembly between adjacent edges.

4. A drum for storage of nuclear reactor fuel assemblies as claimed in claim 2, further comprising a second pipe section arranged coaxially with said first pipe section and positioned in proximity to said bottom end face of said cylinder and a space between said pipe sections defines said longitudinal portion of each enclosure.

* * * * *